United States Patent
Rose et al.

(10) Patent No.: US 8,711,844 B2
(45) Date of Patent: Apr. 29, 2014

(54) PEER-TO-PEER, INTERNET PROTOCOL TELEPHONE SYSTEM WITH PROXY INTERFACE FOR CONFIGURATION DATA

(75) Inventors: Christopher Rose, Surrey (CA); Gerry Knopp, Calgary (CA)

(73) Assignee: VTech Telecommunications Limited, Tai Po, New Territory (HK)

( * ) Notice: Subject to any disclaimer, the term of this patent is extended or adjusted under 35 U.S.C. 154(b) by 151 days.

(21) Appl. No.: 12/987,860

(22) Filed: Jan. 10, 2011

(65) Prior Publication Data
US 2012/0177030 A1    Jul. 12, 2012

(51) Int. Cl.
*H04L 12/66*    (2006.01)

(52) U.S. Cl.
USPC ......................................................... 370/352

(58) Field of Classification Search
USPC .................. 370/352, 400, 338; 709/219, 228; 455/435.1
See application file for complete search history.

(56) References Cited

U.S. PATENT DOCUMENTS

| | | | |
|---|---|---|---|
| 2004/0141484 A1* | 7/2004 | Rogalski et al. | 370/338 |
| 2006/0007942 A1* | 1/2006 | Ogawa | 370/400 |
| 2006/0209773 A1* | 9/2006 | Hundal et al. | 370/338 |
| 2007/0123256 A1* | 5/2007 | Whitesell et al. | 455/435.1 |
| 2009/0316687 A1* | 12/2009 | Kruppa | 370/352 |
| 2010/0017500 A1* | 1/2010 | Lee | 709/219 |
| 2010/0284396 A1* | 11/2010 | Kalmstrom | 370/352 |
| 2011/0252151 A1* | 10/2011 | Lu et al. | 709/228 |

FOREIGN PATENT DOCUMENTS

| | | | | |
|---|---|---|---|---|
| EP | 1229443 A2 * | 8/2002 | | H04L 12/56 |
| EP | 1229443 A2 * | 8/2002 | | H04L 12/56 |
| JP | 2007336247 A * | 12/2007 | | |

OTHER PUBLICATIONS

Miika Määttä,Platform Independent Web-Based Peer-To-Peer Application, 2010, Department of Electrical and Information Engineering Degree Programme in Electrical Engineering, Univ. of Oulu.*

* cited by examiner

*Primary Examiner* — Asad Nawaz
*Assistant Examiner* — Parth Patel
(74) *Attorney, Agent, or Firm* — Steptoe & Johnson LLP (57) ABSTRACT

Various embodiments of the invention provide a Peer-to-Peer (P2P, Internet Protocol (IP) telephone system. The telephone system includes a plurality of terminals coupled together via an IP network. The terminals cooperate with one another to provide telephony features without a dedicated central controller such as a PBX and/or a KSU controller. The terminals may further receive requests for configuration data residing on other terminals, relay the requests to such other terminals to obtain the request configuration, and return the requested configuration data to the requesting device.

17 Claims, 4 Drawing Sheets

PEER-TO-PEER, INTERNET PROTOCOL TELEPHONE SYSTEM WITH PROXY INTERFACE FOR CONFIGURATION DATA

FIELD OF THE INVENTION

The present invention relates to Peer-to-Peer (P2P), Internet Protocol (IP) telephone systems. More specifically, certain embodiments of the invention relate to proxy interfaces to configuration data in P2P, IP telephone systems.

BACKGROUND OF INVENTION

Small enterprise environments typically desire telephone systems that provide a variety of communication features. For example, small enterprise environments typical desire telephones systems that provide internal intercom calls from one telephone terminal to another telephone terminal within the telephone system while still supporting external public switched telephone network (PSTN) calls between a telephone terminal within the system and an external telephone system connected to the PSTN. Other features desired by small enterprise environments may include call conferencing, call transferring, and voice mail functions.

A Peer-to-Peer (P2P), Internet Protocol (IP) telephone system may provide such features. However, such a P2P, IP telephone system may include configuration data that is not entirely known by any one device in the system. Some types of data may be known by all devices, but other types of data may reside on a subset of devices or on only one device. Therein, if a user interface is provided to allow an end-user to make changes to configuration data in such a system, techniques for obtaining data that may be located elsewhere in the system may be required.

SUMMARY OF INVENTION

Aspects of the present invention are directed to methods, systems, and apparatus, substantially as shown in and/or described in connection with at least one of the figures and as set forth more completely in the claims.

These and other advantages, aspects and novel features of the present invention, as well as details of illustrative aspects thereof, will be more fully understood from the following description and drawings.

DETAILED DESCRIPTION

Aspects of the invention may be found in a method and apparatus that provide a user interface configured to update configuration data in a peer-to-peer (P2P), Internet Protocol (IP) telephone system. Certain embodiments of the invention provide a small enterprise telephone system comprising two or more telephone terminals that coordinate between themselves to implement private branch exchange (PBX) and/or key services unit (KSU) type functionality without the use of a central PBX and/or KSU controller. An Internet Protocol (IP) network is used to support communication and coordination between the telephone terminals. Each telephone terminal supports features and functions that may be offered as resources to the telephone system as a whole and may be shared between the various telephone terminals. One or more of the terminals may provide a network-accessible user interface (UI) that permits a user of the system to change configuration data distributed among various terminals of the system.

Due to its P2P nature, the small enterprise telephone system may be expanded with a high degree of flexibility according to the desires of a small enterprise. In particular, telephone terminals with different features may be added and/or removed from the telephone system in order to provide the small enterprise with a desired feature set. For example, telephone terminals may include but are not limited to (a) telephone terminals with corded handset, keypad and display, (b) telephone terminals with corded handset, keypad, display, and a PSTN telephone jack to support calls using a public switched telephone network (PSTN), (c) basic telephone terminals with corded handset, keypad, display, and a telephone answering device that provide voice mail functions, (d) wireless telephone terminals that connect to the IP network via a wireless IP link, and (e) PSTN gateway terminals with PSTN telephone jacks to support calls using the PSTN.

Figure 1:
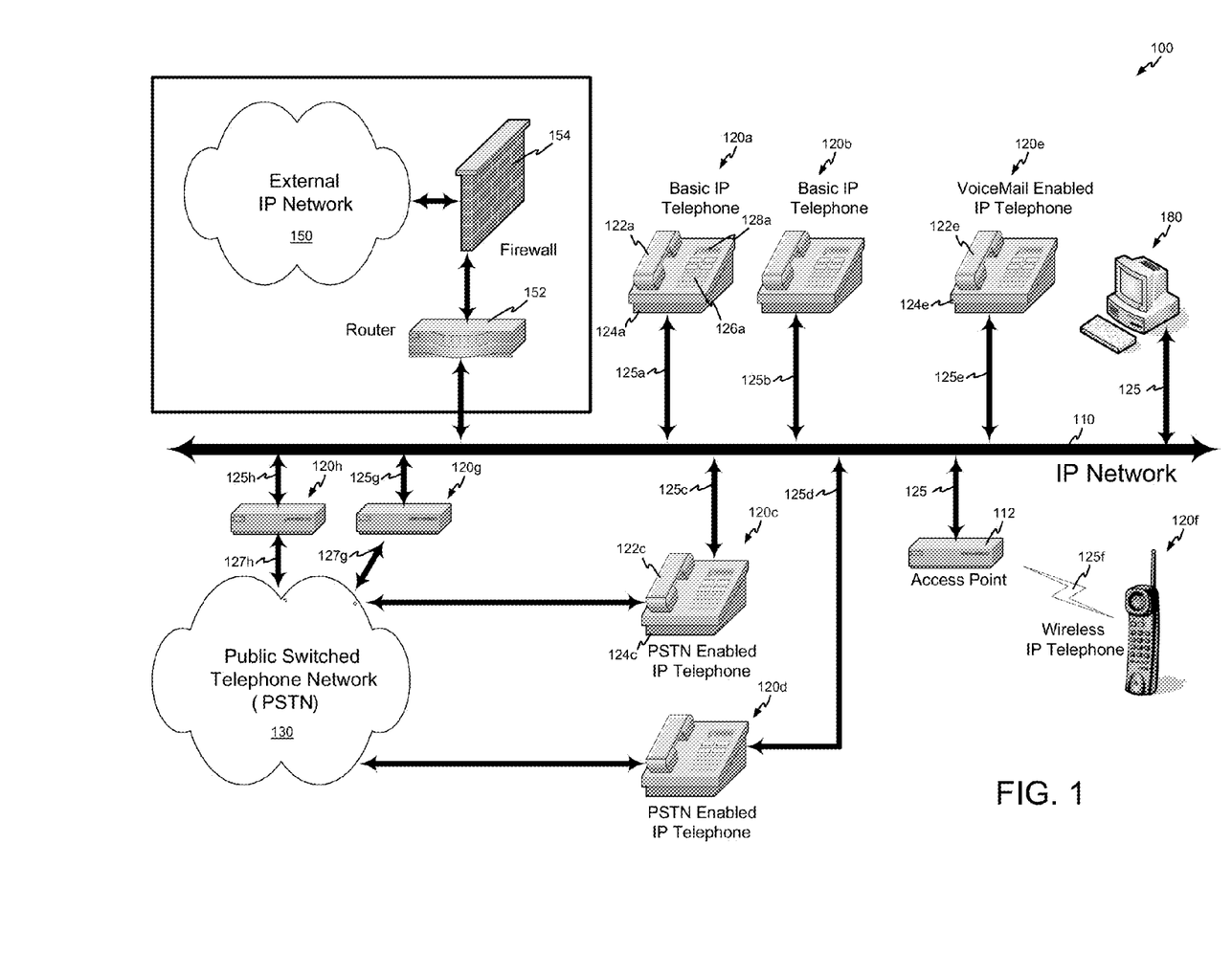
FIG. 1 is a diagram that illustrates a peer-to-peer (P2P), internet protocol (IP) telephone system, in accordance with an embodiment of the invention.

Referring now to FIG. 1, a small enterprise telephone system 100 that uses an IP network 110 to support communication between a plurality of telephone terminals 120 (e.g. terminals 120*a-f*) is shown. Unlike conventional Voice over Internet Protocol (VoIP) telecommunications system, the telephone system 100 does not include a central controller node, such as a PBX and/or KSU controller. Rather, control and switching for the telephone system 100 is coordinated among the telephone terminals 120.

As shown, the system 100 uses an IP network 110 to communicatively couple the plurality of telephone terminals 120 to one another. In one embodiment, the IP network 110 is implemented with a fast Ethernet network (e.g., 10/100baseT). However, the IP network 110 may be implemented using other types of IP based networks such as, for example, wireless 802.11 wireless networks, HomePlug power-line networks, public Internet network, etc.

FIG. 1 shows different types of telephone terminals 120. In particular, telephone terminals 120*a*, 120*b* are depicted as basic IP telephone terminals coupled to the IP network 110 via wired IP connections 125*a*, 125*b* (e.g., a Cat 5 Ethernet cable). The basic IP telephone terminal 120*a* may include a handset 122*a* and base unit 124*a*, which provide a voice interface and a user interface to the system 100. In particular, the handset 122*a* may be coupled to the base unit 124*a* via a cord (not shown).

The handset 122*a* and base unit 124*a* may each include a microphone and speaker (not shown). As a result, a user may interact with the telephone system 100 via the voice interface provide by the handset 122*a* which receives voice input from a user and outputs audio signals to the user via its microphone and speaker. Alternately, a user may elect to interact with the telephone system 100 via the voice interface provided by the base unit 124*a*, which receives voice input from a user and outputs audio signals to the user via its microphone and speaker when operating in a speakerphone mode of operation.

In addition to the voice interface, the handset 122*a* and the base unit 124*a* may each include a keypad 126*a* and display 128*a* which provide a user interface to the system 100. The keypad 126a may permit a user to input digits and/or other information via one or more key presses, and the display 128a may provide the user with textual and/or graphical information. Furthermore, the base unit 124a may include an network interface configured to transmit and receive IP packets over the IP network 110. The base unit 124a may also include circuitry (e.g., processor, microcontroller, data storage devices, etc.), software, and/or firmware configured to conduct a telephone call over the IP network 110.

Besides basic IP terminals 120a, 120b, the telephone system 100 may further include PSTN enabled IP telephone terminals 120c, 120d that are coupled to the IP network 110 via wired IP connections 125c, 125d. In particular, the telephone terminal 120c may include a handset 122c and base unit 124c that provide the telephone terminal 120c with functionality similar to that provided by the basic IP telephone terminals 120a, 120b. However, the handset 122c and base unit 124c further include a PSTN interface and corresponding circuitry to convert signals between the PSTN 130 and the IP network 110. In particular, the telephone terminals 120c, 120d include circuitry configured to handle on-hook/off-hook signaling, the detection of incoming PSTN calls, the reception of call ID (CID) signals, the generation of outgoing dialing tones/pulses, and the conversion of voice signals. In one embodiment, the IP telephone functionality of the telephone terminals 120c, 120d are functionally independent of the PSTN interface functionality, thus permitting simultaneous usage of both the IP telephone functionality and the PSTN interface functionality of the terminals 120c, 120d.

As shown, the telephone system 100 may further include VoiceMail (VM) enabled IP telephone terminal 120e that is coupled to the IP network 110 via a wired IP connection 125e. The telephone terminal 120e includes a handset 122e and base unit 124e that provide the telephone terminal 120e with functionality similar to that provided by the handset and base unit of the basic IP terminal 120a. The base unit 124e, however, further includes an integrated telephone answering device, which may provide voicemail features to all of the telephone terminals 120 of the telephone system 100.

The telephone system 100 may also include a wireless IP telephone terminal 120e that is coupled to the IP network 110 via a wireless IP connection 125f and a wireless access point 112. The wireless IP telephone terminal 120f may provide functionality similar to that provided by the basic IP telephone terminals 120a, 120b. However, unlike the basic IP telephone terminals 120a, 120b, the wireless IP telephone terminal 120f is not tethered to the telephone system 100 by a wired IP connection, thus permitting the user of the wireless IP telephone 120f greater mobility.

The telephone system 100 may also include gateway terminals 120g-h. Each gateway terminal 120g-h may be connected to the IP network 110 via a respective wired connections 125g-h and to the PSTN 130 by one or more (e.g., four) wired connections 127g-h. Each gateway terminal 120g-h in one embodiment operates in a manner similar to the PSTN-enabled, IP telephone terminals 120c-d by providing PSTN connectivity to other terminals 120 of the telephone system 100.

The telephone system 100 may further include one or more computing devices 180 such as a laptop computer, desktop computer, workstation, handheld device, and/or other device that may be coupled to the IP network 110. The computing device 180 may include digital circuitry (e.g., processors, memory, and control logic), software and/or firmware, and user interface hardware (e.g., keyboard, mouse, display, etc.) that in combination present a user with a client suitable for interacting with a network-accessible interface of the terminals 120.

Each telephone terminal 120 provides one or more resources that contribute to the entire functionality of the telephone system 100. The PSTN enabled IP telephone terminal 120c, for example, provides to a user of the telephone terminal 120c (a) a user extension resource for voice communication, (b) a user display resource for messaging purposes, and (c) a user keypad resource for user input. Moreover, the PSTN enable IP telephone terminal 120c provides a PSTN interface resource for not only the PST enable IP telephone terminal 120c but the other IP telephone terminals 120 of the telephone system 100. Similarly, the VM-enabled telephone terminal 120d provides VM functionality not only to the user of the VM-enable telephone terminal 120d, but also to the other IP telephone terminals 120 of the telephone system 100.

The IP telephone terminals 120 described above are not an exhaustive set of the terminals that may be added to the telephone system 100. Other types of P2P terminals are contemplated and may be added to the telephone system 100 in order to expand the overall functionality of the telephone system 100. For example, the telephone system 100 may further include terminals which provide only VoiceMail functionality (e.g., a terminal similar to terminal 120e, but without a telephone handset), a video IP phone terminal which supports video IP communication, and other terminal configurations.

As shown, the telephone system 100 may also include an interface between the local IP network 110 and an external IP network 150 (e.g., the Internet). Such an interface may include a router 152 and/or firewall device 154. While not essential for the operation of the telephone system 100, such an external interface supports communication between IP telephone terminals 120 within the telephone system 100 and IP telephone terminals 120 external to the telephone system 100, whether they be at a remote office (acting as an extension to the telephone system 100) or at a third party site (either a VoIP service provider or an IP based end terminal).

Due to its P2P nature, the telephone system 100 uses various non-conventional techniques to provide operation and features comparable to those available in conventional PBX and/or KSU systems. One such technique relates to discovery of terminals such as IP telephone terminals 120. In response to a terminal 120 being connected to the telephone system 100, the newly added terminal 120 performed two tasks. First, the new terminal 120 discovers which other terminals 120 are already connected to the telephone system 100, their capabilities (resource set), and their addresses so that the terminal 120 may configure itself for use in the telephone system 100. Second, the newly added terminal 120 announces its presence on the telephone system 100 to notify existing terminals 120 of its capabilities and address.

In one embodiment, an extension of the DHCP (Dynamic Host Configuration Protocol) is used to implement the discovery process. In such an embodiment, a newly connected terminal 120 broadcasts on the system 100 a request for DHCP services which typically assigns an IP address to the new terminal 120. In particular, the new terminal 120 may identify itself (e.g., a VoIP terminal) with the DHCP request. Existing terminals 120 of the telephone system 100 may also receive the broadcast DHCP request and response and update their configuration information accordingly so that they may directly communicate with the newly added terminal 120 at the addressed assigned by the DHCP server. Other terminals 120 already on the system 100 also receive the DHCP broadcast. While an extension of the DHCP protocol may be used, other embodiments may implement terminal discovery using another protocol. For example, other embodiments may use other protocols such as, for example. the BOOTP protocol, the Web Proxy Autodiscovery (WPAD) protocol, the Zeroconf protocol, the Boot Service Discovery Protocol (BSDP), the Universal Plug and Play (UPnP) set of protocols, and/or a custom protocol.

As an example of a custom protocol, a newly added terminal 120 may listen for beacon signals on the IP network 110 to determine whether a telephone system 100 is established. In response to a beacon signal, the terminal 120 may request the sender of the beacon signal (e.g., a Master Coordinator as explained in detail below in regard to FIG. 2-4) to join the telephone system 100. The newly added terminal 120 may then wait for a beacon signal that indicates system-wide configuration data has been updated. The updated system-wide configuration data may include an extension number for the terminal 120 which advises the newly added terminal and other terminals 120 in the telephone system 100 of the resources available in the new terminal 120.

Once terminals 120 are aware of other terminals on the system 100, the terminals 120 may configure themselves. For example, a newly added terminal 120 in the system 100 may be able to detect, for example, that there are other terminals 120 with extension numbers 10, 11 and 12. The newly added terminal 120 may be able to automatically configure itself to be extension number 13, and may then advise the other terminals 120 of its selected extension number. However, if the newly add terminal 120 had been previously configured with the extension number 14, then the terminal 120 may retain this extension number. Similarly, if this newly added terminal 120 has PSTN interface, then the existing terminals 120 may re-configure themselves to support use of this newly available PSTN telephone line. Further details regarding updating configuration data which may be used by some embodiments is presented below.

The telephone system 100 in certain embodiments supports resource sharing. As a result of such resource sharing, a small enterprise may continually expand the telephone system 100 by installing new terminals 120. For example, if a user of terminal 120a desires to make a PSTN call, the terminal 120 may send a message to terminal 120c requesting use of it's PSTN interface. Terminal 120a, in one embodiment, already knows that terminal 120c has a PSTN interface due to the discovery process. If the PSTN interface of terminals 120c is not already in use, then terminal 120c may assign the PSTN resource to terminal 120a. If further requests for the PSTN resource arrive at terminal 120c while still being assigned to terminal 120a, then terminal 120c may deny such additional requests until terminal 120a has completed it's use of the PSTN resource. Terminal 120a may then forward a message to terminal 120c which requests terminals 120c to dial the appropriate telephone number for PSTN call on the PSTN network 130, and establish a VoIP connection between the PSTN network 130 and terminal 120a.

In some embodiments, terminal 120c may still be available for calls on the IP network 110 since the PSTN interface to the PSTN network 130 and VoIP interface to the IP network 110 are implement as independent resources in some embodiments. Furthermore, if a user at terminal 120c wishes to make a PSTN call while its PSTN interface is still assigned to terminal 120a, terminal 120c may request use of the PSTN interface of terminal 120d to facilitate this PSTN call. In this way, any IP telephone terminal 120 in the telephone system 100 has the ability to access any PSTN connection.

Other resources, such as a voice mail system, may be shared among the terminals 120 in a similar fashion. Once a terminal 120 is finished with a resource, a message is sent to the associated terminal 120 indicating the resource may be released and made available for other requests from the telephone system 100. The terminals 120 may also implement a time-out mechanism to ensure the telephone system may recover from error conditions such as a terminal 120 being disconnected from the IP network when in control of a resource of another terminal 120.

The telephone system 100 may further include distributed control aspects. In particular, each of the terminals 120 may include circuitry, software, and/or firmware which determine how to best facilitate a user's request. In a conventional PBX and/or KSU system, a central PBX and/or KSU server controls of all resources of the telephone system. In the peer-to-peer telephone system 100, each terminal 120 controls only those resources that are part of its hardware, and loans them to other terminals 120 based on resource requests. The distributed control enables a terminal 120 to resolve conflicts where the terminal 120 may receive simultaneous resource requests, as well as enabling terminals 120 to determine where in the telephone system 100 to seek specific resources As mentioned above, the telephone system 100 is a P2P telephone system in which the terminals 120 communicate directly with each other without the coordination efforts of a central controller such as a PBX and/or KSU central controller. For proper operation of the telephone system 100, the terminals 120 include configuration data that is shared among all terminals 120 within the telephone system 100. For example, the configuration data shared among the terminals 120 may include a list of all the telephone terminals 120 and corresponding extension numbers. It is not practical for an end-user to manually update all terminals 120 in the telephone system 100 to contain the same configuration data. Moreover, the telephone system 100 does not contain a dedicated central controller for coordinating the dispersal of such configuration data. Accordingly, each terminal 120 of the telephone system 100 in one embodiment may implement a process that automatically propagates configuration data throughout the P2P, IP telephone system 100.

Despite such propagation of configuration data throughout the telephone system 100, certain configuration data may only be stored in a single terminal 120 or a sub-set of terminals 120 for various reasons. In light of such locally stored data, a user interface used to configure the telephone system 100 may desire to obtain and/or change such locally stored configuration data. To this end, one or more of the terminals 120, in one embodiment, are configured to provide a network-accessible UI which a user may access via a network client (e.g. a web browser client) to obtain and/or change such locally stored configuration data. Accordingly, as shown in FIG. 1, a computing device 180 such as a laptop computer, desktop computer, workstation, handheld device, and/or other web-enabled device may be coupled to the IP network 110 to permit a user of such device 180 to access the network-accessible UI.

Figure 2:
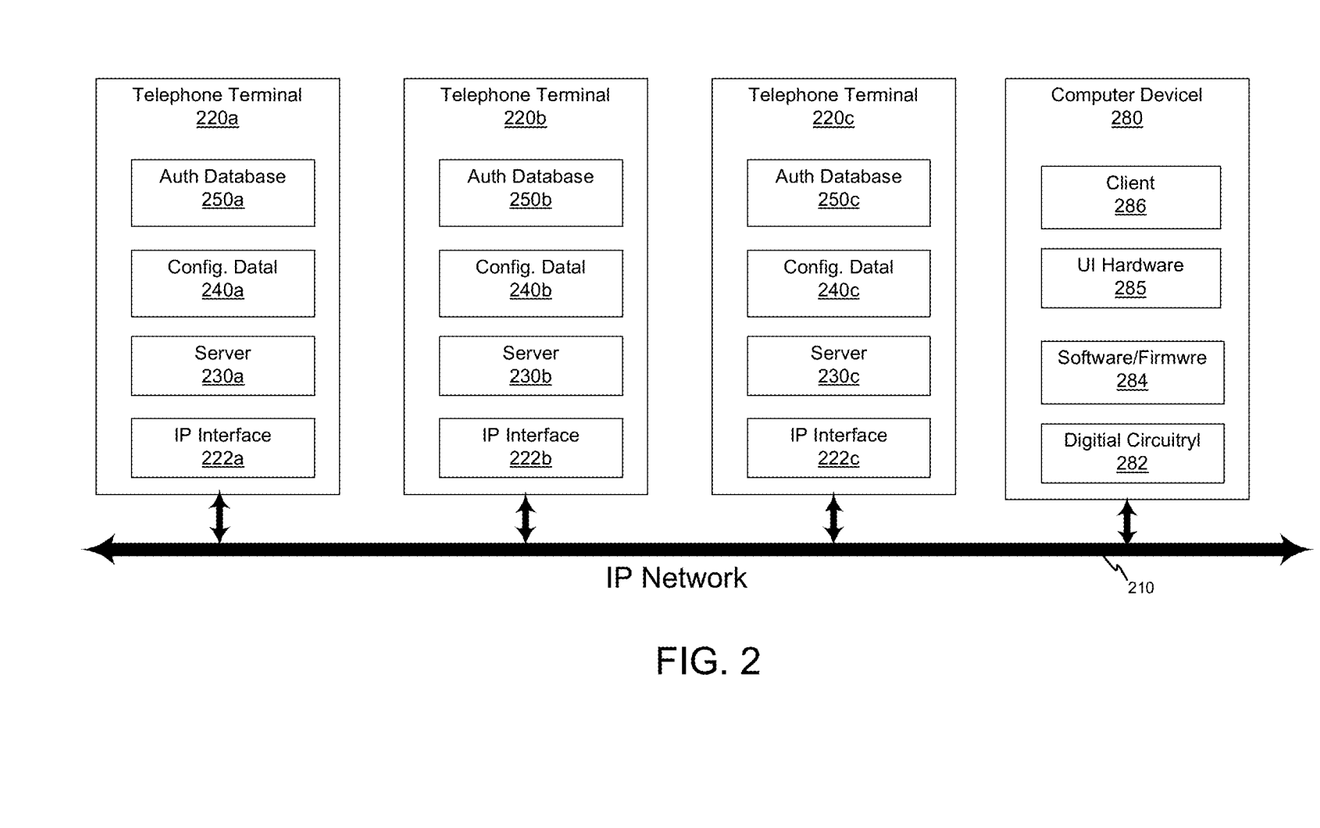
FIG. 2 is a simplified diagram of a P2P, IP telephone system, in accordance with an embodiment of the invention.

Referring now to FIG. 2, a simplified diagram of a P2P, IP telephone system 200 is shown which highlights aspects associated with providing a network-accessible UI configured to obtain and/or change configuration data of the telephone system 200. In particular, the telephone system 200 is shown with terminals 220a-c coupled to one another via an IP network 210. Moreover, a computing device 280 is also shown coupled to the IP network 210. Each of the terminals 220a-c may include an IP interface 222a to the IP network 210, a server 230a-c, configuration data 240a-c, and an authentication database 250a-c. In some embodiments, the authentication database 250a-c may be implemented as part of the configuration data which the terminals 220*a-c* automatically propagate among the terminals 220*a-c* of the system 200. Moreover, the terminals 220*a-c* may be implemented in a manner similar to any of the terminals described above in regard to FIG. 1.

Each server 230*a-c* may include a hypertext transfer protocol (HTTP) server and associated business logic to provide a network-accessible UI for obtaining and/or changing configuration data in the system 200. To this end, each terminal 220*a-c* may include digital circuitry (e.g., processors, memory, and control logic) as well as software and/or firmware that in combination implement its server 230*a-c* and its business logic associated with the network-accessible UI. While each server 230*a-c*, in one embodiment, may include a HTTP server and associated business logic to provide the network-accessible UI, other embodiments may utilize other data transfer protocols, servers, and/or clients in order to provide the functionality of the network-accessible UI.

The computing device 280 may include digital circuitry 282 (e.g., processors, memory, and control logic), software and/or firmware 284, and user interface hardware 285 (e.g., keyboard, mouse, display, etc.) that in combination present a user with a client 286 suitable for interacting with the network-accessible UI of the servers 230*a-c*. In one embodiment, the client 286 comprises a conventional web browser (e.g., Firefox™, Chrome™, and Internet Explorer™ browsers). However, other embodiments of the computing device 280 may provide a propriety client for accessing the network-accessible UI of the terminals 220*a-c*.

Figure 3:
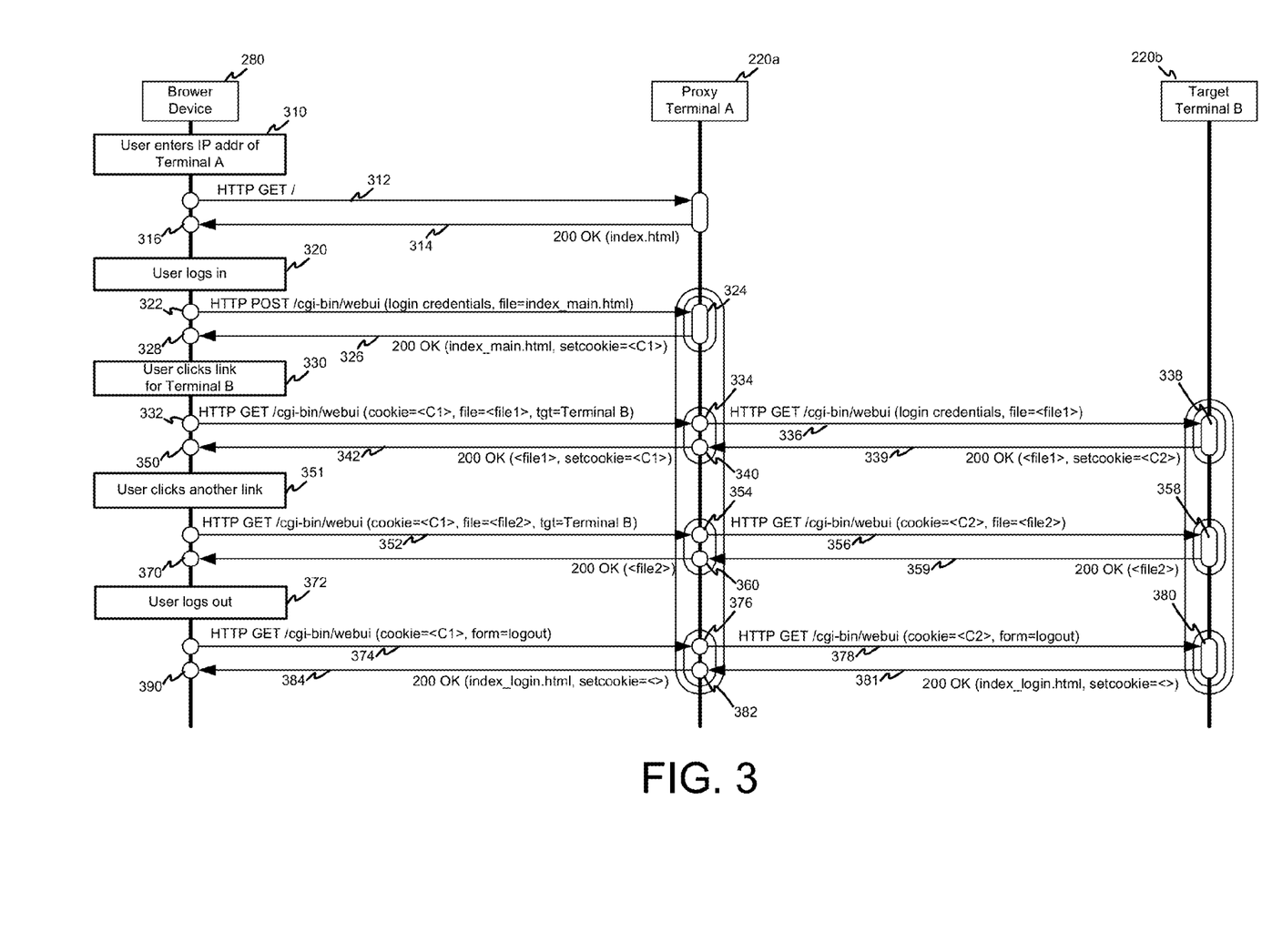
FIG. 3 is a chart showing interaction of a client device with a proxy terminal to obtain configuration data from target terminal of FIG. 2.

Referring now to FIG. 3, a method for accessing configuration data of a target terminals through a proxy terminal is shown. In the interest of simplifying the description of FIG. 3, the method is described from the standpoint of the computing device 280 accessing configuration data of target terminal 220*b* via a proxy terminal 220*a*. However, in one embodiment, any terminal 220*a-c* may play the role of proxy for another terminal 220*a-c*. For example, the computing device 280, in another embodiment, may access configuration of target terminal 220*c* via proxy terminal 220*b*.

As shown, a user first establishes a session with the proxy terminal 220*a*. To this end, the user at 310 enters the IP address or Universal Resource Location (URL) for the proxy terminal 220*a* via the client 286 of the computing device 280. In response to such input, the computing device 280 at 312 sends an HTTP GET request to the proxy terminal 220*a* for a default page of the proxy terminal 220*a*. In response to such request, the server 230*a* of the proxy terminal 220*a* at 314 locates and returns the default page (e.g., index.html) which includes a form for entering login credentials of the user. At 316, the client 286 may render the page received from the proxy terminal 220*a* and presents the page including its form for entering login credentials to the user via the user interface hardware 285.

In response to such request for login credentials, the user at 320 may fill in the form for the login credentials (e.g., username and password). At 322, the client 286 may submit the filled-out form to the server 230*a* which causes the login credentials (e.g., username and password) and a requested response page (e.g., index_main.html) to be sent via a HTTP POST.

The server 230*a* at 324 may process the credentials received via the HTTP POST to ensure the credentials are valid. In particular, the server 230*a* may reference authentication database 250*a* to ensure the received username and password correspond to a valid and authorized account. The server 230*a* may create an internal web session reference that remains valid for the duration of the user's interaction with the server 230*a*. In particular, the internal web session reference may remain valid until the user logs out, or until a session timeout terminates the session. To track this session for subsequent requests, the server 230*a* at 326 may return a session cookie <C1> to the client 286 along with the requested response page (e.g., index_main.html) to be rendered by the client 286. During the remainder of the session, the client 286 may include the session cookie <C1> in all subsequent requests. When receiving subsequent requests, the server 230*a* may match the received session cookie value to the internal session reference, determine if that session is still valid, and determine whether to process the corresponding request.

At 328, the client 286 may render the page received from the proxy terminal 220*a* and present the page including to the user via the user interface hardware 285. The user at 330 may request configuration data <file1> residing on terminal 220*b* by, for example, clicking a link in the presented page that corresponds to configuration data <file1>. At 332, the client 286 may send an HTTP GET request to terminal 220*a* for configuration data <file1> that resides in terminal 220*b*. In particular, the HTTP GET request may identify the configuration data <file1> and target terminal 220*b* and provide the session cookie <C1>.

The server 230*a* of the terminal 220*a* at 334 may confirm the validity of the session cookie <C1>. Assuming validity of the session cookie <C1>, the server 230*a* may then establish a separate session between the terminal 220*a* and the target terminal 220*b*. In particular, the server 230*a* at 336 may send to the target terminal 220*b* an HTTP GET request comprising login credentials (e.g., username and password) and an identifier for the configuration data <file1>. At 338, the server 230*b* of the target terminal 220*b* may use its authentication database 250*b* to confirm the validity of the received login credentials. Assuming the login credentials are valid, the server 230*b* at 339 may establish the session and return a session cookie <C2> back to the proxy terminal 220*a* along with the webpage and corresponding configuration data <file1> listed in the initial request.

At 340, the proxy terminal 220*a* may store the session cookie <C2> within its internal reference data and associate the session cookie <C2> with the session cookie <C1>. At 342, the proxy terminal 220*a* may attach the configuration data <file1> with the original session cookie <C1>, and pass the configuration data <file1> and session cookie <C1> back to the client 286.

At 350, the client 286 may update the page based upon the configuration data <file1> received from the target terminal 220*b* via the proxy terminal 220*a*, and present the updated page to the user via the user interface hardware 285. The user at 351 may request other configuration data <file2> residing on terminal 220*b* by, for example, clicking another link in the presented page that corresponds to configuration data <file2>. At 352, the client 286 may send an HTTP GET request to proxy terminal 220*a* for configuration data <file2> that resides in target terminal 220*b*. In particular, the HTTP GET request may identify the configuration data <file2> and target terminal 220*b* and provide the session cookie <C1>.

At 354, the proxy terminal 220*a* may check and confirm the validity of the session cookie <C1>, determine the session associated with the cookie <C1> is currently involved in a proxy session with target terminal 220*b*. At 356, the proxy terminal 220*a* may substitute the session cookie <C2> for proxy terminal 220*b* and pass the request through to the target terminal 220*b* for processing. At 358, the target terminal 220*b* may check and confirm the validity of the session cookie <C2>. After confirming the validity of the session cookie <C2>, the target terminal 220b at 359 may return the webpage and requested configuration data <file2> to the proxy terminal 220a. The proxy terminal 220a at 360 may then return the received webpage and requested data file <file2> to the client 286.

At 370, the client 286 may update the page based upon the configuration data <file2> received from the target terminal 220b via the proxy terminal 220a, and present the updated page to the user via the user interface hardware 285. The user at 372 may logout by, for example, clicking link in the presented page that corresponds to a logout request. At 374, the client 286 may send to proxy terminal 220a an HTTP GET request that includes the session cookie <C1> and identifies an logout form. At 376, the proxy terminal 220a may check and confirm the validity of the session cookie <C1>, determine the session associated with the cookie <C1> is currently involved in a proxy session with target terminal 220b. Accordingly, the proxy terminal 220a may substitute the session cookie <C2> for proxy terminal 220b and pass the logout request through to the target terminal 220b at 378.

At 380, the target terminal 220b may check and confirm the validity of the session cookie <C2>. After confirming the validity of the session cookie <C2>, the target terminal 220b may invalidate the session cookie <C2> in its internal reference data, and return a webpage and a blank session cookie to the proxy terminal 220a at 381. The proxy terminal 220a at 382 may then invalidate the session cookie <C1> in its internal reference data, and return the received webpage and blank session cookie to the client 238 at 384. At 390, the client 286 may render the webpage provided by the target terminal 220b via the proxy terminal 220a and invalidate the session cookie <C1>, thus ending its session with the target terminal 220b.

Figure 4:
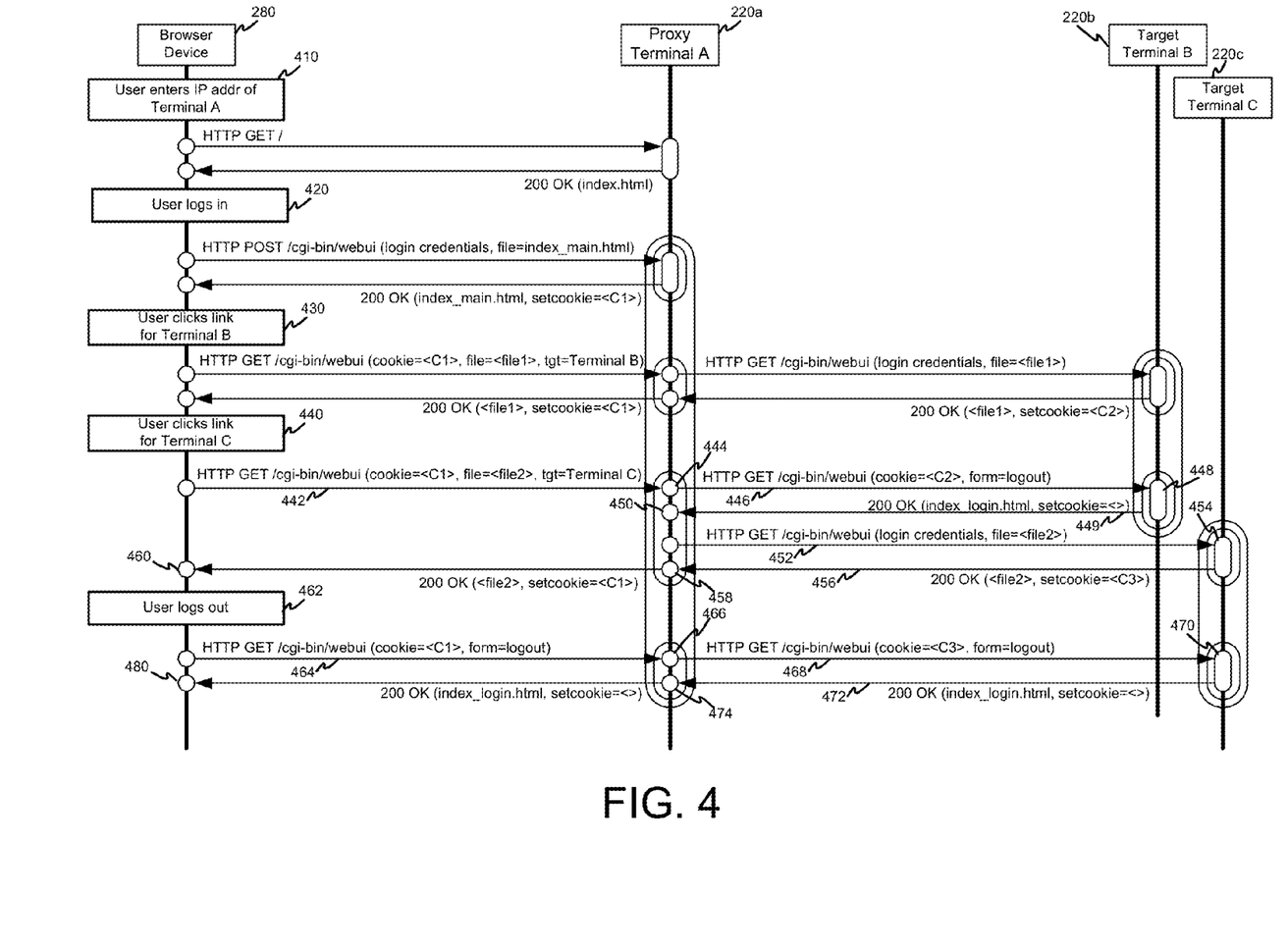
FIG. 4 is a chart showing interaction of a client device with a proxy terminal to obtain configuration data from two separate target terminals of FIG. 2.

Referring now to FIG. 4, a method for accessing configuration data of multiple target terminals through a single proxy terminal is shown. In the interest of simplifying the description of FIG. 4, the method is described from the standpoint of the computing device 280 accessing configuration data of target terminals 220b, 220c via a proxy terminal 220a. However, in one embodiment, any terminal 220a-c may play the role of proxy for another terminal 220a-c. For example, the computing device 280, in another embodiment, may access configuration of target terminals 220a, 220c via proxy terminal 220b.

As shown in FIG. 4, a user at 410 may enter the IP address or URL for the proxy terminal 220a into a client 286 to cause the client to request a default page from the proxy terminal 220a. At 420, the user may log into the proxy terminal 220a by, for example, supplying login credentials via a from of the default page. As a result logging-in, the client 286 may obtain a session cookie <C1> from the proxy terminal 220a. At 430, the user may request configuration data <file1> from target terminal 220b which causes the proxy terminal 220a to establish a session with the target terminal 220b and obtain a session cookie <C2>. Accordingly, the above aspects of FIG. 4 may be implemented in a manner similar to corresponding aspects of FIG. 3.

However, at 440, a user may request configuration data <file2> residing on terminal 220c by, for example, clicking a link in a page presented by the client 286 that corresponds to configuration data <file2>. At 442, the client 286 may send an HTTP GET request to terminal 220a for configuration data <file2> that resides in terminal 220c. In particular, the HTTP GET request may identify configuration data <file2> and target terminal 220c and may provide the session cookie <C1>.

The server 230a of the terminal 220a at 444 may confirm the validity of the session cookie <C1> and determine the session cookie <C1> is currently associated with a session with target terminal 220b and not the currently requested target terminal 220c. The server 230a may then terminate the session with target terminal 220b and establish a session with target terminal 220c. While the following describes terminating the session with target terminal 220b and then establishing the session with target terminal 220c, other embodiments may perform such tasks in reverse order or in parallel.

In particular, the server 230a at 446 may send to target terminal 220b an HTTP GET request that includes the session cookie <C2> and identifies an logout form. At 448, the target terminal 220b may check and confirm the validity of the session cookie <C2>. After confirming the validity of the session cookie <C2>, the target terminal 220b may invalidate the session cookie <C2> in its internal reference data, and return a webpage and a blank session cookie to the proxy terminal 220a at 449. The proxy terminal 220a at 450 may then invalidate the session cookie <C2> in its internal reference data.

The server 230a may then establish a separate session between the terminal 220a and the target terminal 220c. In particular, the server 230a at 452 may send to the target terminal 220c an HTTP GET request comprising login credentials (e.g., username and password) and an identifier for the configuration data <file2>. At 454, the server 230c of the target terminal 220c may use its authentication database 250c to confirm the validity of the received login credentials. Assuming the login credentials are valid, the server 230c at 456 may establish the session and return a session cookie <C3> back to the proxy terminal 220a along with the webpage and corresponding configuration data <file2> listed in the initial request. The proxy terminal 220a at 458 may then return the received webpage and requested data file <file2> to the client 286.

At 460, the client 286 may update the page based upon the configuration data <file2> received from the target terminal 220c via the proxy terminal 220a, and present the updated page to the user via the user interface hardware 285. The user at 462 may then logout by, for example, clicking a link in the presented page that corresponds to a logout request. At 464, the client 286 may send to proxy terminal 220a an HTTP GET request that includes the session cookie <C1> and identifies an logout form. At 466, the proxy terminal 220a may check and confirm the validity of the session cookie <C1>, and determine the session associated with the cookie <C1> is currently involved in a proxy session with target terminal 220c. Accordingly, the proxy terminal 220a may substitute the session cookie <C3> for proxy terminal 220c and pass the logout request through to the target terminal 220c at 468.

At 470, the target terminal 220c may check and confirm the validity of the session cookie <C3>. After confirming the validity of the session cookie <C3>, the target terminal 220c may invalidate the session cookie <C3> in its internal reference data, and return a webpage and a blank session cookie to the proxy terminal 220a at 472. The proxy terminal 220a at 474 may then invalidate the session cookie <C1> in its internal reference data, and return the received webpage and blank session cookie to the client 238. At 480, the client 286 may render the webpage provided by the target terminal 220b via the proxy terminal 220a and invalidate the session cookie <C1>, thus ending its session with the proxy terminal 220a.

The above described proxy approach of an IP telephone terminal may permit another IP telephone terminal to access data of IP telephone terminals that reside behind a NAT router/firewall, wherein such data would not otherwise be accessible. Merely redirecting an IP telephone terminal to another IP telephone terminal for data may result in the IP telephone terminal attempting to access data of an IP telephone terminal residing behind a NAT router/firewall without a publicly accessible address. In such a situation, the request for data would fail due to the intervening NAT router/firewall and no public interface. However, if an IP telephone terminal having the above proxy features is implemented behind the NAT router/firewall with a publicly accessible address, then the IP telephone terminal may fulfill the requests for data and thereby make such data behind the NAT router/firewall accessible.

Various embodiments of the invention are described herein by way of example and not by way of limitation in the accompanying figures. For clarity of illustration, exemplary elements illustrated in the figures may not necessarily be drawn to scale. In this regard, for example, the dimensions of some of the elements may be exaggerated relative to other elements to provide clarity. Furthermore, where considered appropriate, reference labels have been repeated among the figures to indicate corresponding or analogous elements.

Moreover, certain embodiments may be implemented as a plurality of instructions on a tangible computer readable medium such as, for example, flash memory devices, hard disk devices, compact disc media, DVD media, EEPROMs, etc. Such instruction when executed by a telephone terminal or other device, may configure the telephone terminal or other device to perform tasks associated with receiving requests for configuration data residing on other telephone terminals and acting as a proxy for such requests for configuration data.

One skilled in the art would readily appreciate that many modifications and variations of the disclosed embodiments are possible in light of the above teachings. Thus, it is to be understood that, within the scope of the appended claims, aspects of the disclosed embodiments may be practiced in a manner other than as described above.

What is claimed is:

1. A telephone terminal for configuring a plurality of telephone terminals of a telephone system, the telephone terminal comprising:
   circuitry configured to conduct a telephone call over an Internet Protocol (IP) network; and
   a server configured to:
      display a network-accessible user interface on a client device by transferring aspects of the network-accessible user interface to a web browser of the client device via the IP network;
      receive, from the client device via the IP network and the network-accessible user interface displayed by the web browser, a request for configuration data used to configure one or more telephone terminals of the plurality of telephone terminals, wherein the request identifies the configuration data, identifies a target telephone terminal, and provides a session cookie;
      determine that the requested configuration data resides on another telephone terminal;
      relay the request to the another telephone terminal to obtain the requested configuration data from the another telephone terminal;
      access configuration data of multiple target telephone terminals through a single proxy terminal;
      update the network-accessible user interface displayed by the web browser to present the requested configuration data to the client device via the network-accessible user interface;
      receive, from the client device via the IP network and the network-accessible user interface displayed by the web browser, another request for configuration data used to configure one or more telephone terminals of the plurality of telephone terminals;
      determine that the another request for configuration data corresponds to further configuration data residing on a third telephone terminal;
      relay the another request to the third telephone terminal to obtain the requested further configuration data from the third telephone terminal; and
      update the network-accessible user interface displayed by the web browser to present the requested further configuration data from the third telephone terminal to the client device via the network-accessible user interface.

2. The telephone terminal of claim 1, wherein the server comprises a hypertext transport protocol (HTTP) server configured to present the network-accessible user interface to the client device.

3. The telephone terminal of claim 1, wherein the server is configured to determine whether the client device has provided valid login credentials prior to returning the requested configuration data to the client device.

4. The telephone terminal of claim 1, wherein the server is configured to:
   establish a first session with the client device and associate a first session cookie with the first session; and
   establish a second session with the another telephone terminal and associate a second session cookie with the second session.

5. The telephone terminal of claim 4, wherein the server is configured to verify that the request received from the client device includes the first session cookie prior to relaying the request to the another telephone terminal.

6. The telephone terminal of claim 4, wherein the server, prior to relaying the request to the another telephone terminal, is configured to verify that the request received from the client device includes the first session cookie, and replace the first session cookie with the second session cookie.

7. The telephone terminal of claim 1, wherein the server is further configured to permit a user of the client device, via the network-accessible user interface displayed by the web browser, to change to the configuration data used to configure the one or more telephone terminals.

8. A method for providing configuration data to a client device via a network-accessible user interface, the method comprising:
   displaying a network-accessible user interface of a first telephone terminal on the client device by transferring aspects of the network-accessible user interface to a web browser of the client device via an Internet Protocol (IP) network;
   receiving, with the first telephone terminal via the IP network and the network-accessible user interface displayed by the web browser, a request from the client device for configuration data used to configure a plurality of telephone terminals of a telephone system, wherein the request identifies the configuration data and a target telephone terminal;
   determining that the requested configuration data resides on a second telephone terminal;
   relaying the request from the first telephone terminal to the second telephone terminal to obtain the requested configuration data from the second telephone terminal;
   accessing configuration data of multiple target telephone terminals through a single proxy terminal;
   updating the network-accessible user interface displayed by the web browser to present the requested configuration data from the second telephone terminal to the client device via the network-accessible user interface of the first telephone terminal;

receiving, from the client device via the IP network and the network-accessible user interface of the first telephone terminal, another request for configuration data used to configure the plurality of telephone terminals; a third telephone terminal;

determining that the another request for configuration data corresponds to further configuration data residing on a third telephone terminal;

relaying the another request to the third telephone terminal to obtain the requested further configuration data from the third telephone terminal; and updating the network-accessible user interface displayed by the web browser to present the requested further configuration data from the third telephone terminal to the client device via the network-accessible user interface of the first telephone terminal.

9. The method of claim 8, further comprising determining with the first telephone terminal whether the client device has provided valid login credentials prior to returning the requested configuration data to the client device.

10. The method of claim 8, further comprising:
establishing, between the first telephone terminal and the client device, a first session having an associated first session cookie; and
establishing, between the first telephone terminal and the second telephone terminal, a second session having an associated second session cookie.

11. The method of claim 10, further comprising verifying that the request received from the client device includes the first session cookie prior to relaying the request to the second telephone terminal.

12. The method of claim 10, further comprising, prior to relaying the request to the second telephone terminal:
verifying that the request received from the client device includes the first session cookie; and
replacing the first session cookie with the second session cookie.

13. The method of claim 8, wherein:
the second telephone terminal stores a file that includes the configuration data; and
the method further comprises receiving, with the first telephone terminal, the file from the second telephone terminal in response to said relaying.

14. The method of claim 8, further comprising permitting a user of the client device to change, via the network-accessible user interface displayed by the web browser, the configuration data used to configure the plurality of telephone terminals.

15. A non-transitory computer readable medium comprising a plurality of instructions, that in response to being executed, configure an Internet Protocol (IP) telephone terminal to:

display a network-accessible user interface on a client device by transferring aspects of the network-accessible user interface to a web browser of the client device via an IP network;

receive, from the client device via the IP network and the network-accessible user interface displayed by the web browser, a request for configuration data used to configure another one or more IP telephone terminals of a telephone system, wherein the request identifies the configuration data and a target telephone terminal;

determine that the requested configuration data resides on another IP telephone terminal;

relay the request to the another IP telephone terminal to obtain the requested configuration data from the another IP telephone terminal;

access configuration data of multiple target telephone terminals through a proxy terminal;

update the network-accessible user interface displayed by the web browser to present the requested configuration data from the another IP telephone terminal to the client device via the network-accessible user interface;

receive, from the client device via the IP network and the network-accessible user interface, another request for configuration data used to one or more IP telephone terminals of the telephone system;

determine that the another request for configuration data corresponds to further configuration data residing on a third telephone terminal;

relay the another request to the third IP telephone terminal to obtain the requested further configuration data from the third IP telephone terminal; and update the network-accessible user interface displayed by the web browser to present the requested further configuration data from the third IP telephone terminal to the client device via the network-accessible user interface.

16. The non-transitory computer readable medium of claim 15, wherein the plurality of instructions further configure the IP telephone terminal to:
establish, with the client device, a first session having an associated first session cookie; and
establish, with the another IP telephone terminal, a second session having an associated second session cookie.

17. The non-transitory computer readable medium of claim 16, wherein the plurality of instructions further configure the IP telephone terminal to, prior to relaying the request to the another IP telephone terminal:
verify that the request received from the client device includes the first session cookie; and
replace the first session cookie with the second session cookie.

* * * * *

UNITED STATES PATENT AND TRADEMARK OFFICE
CERTIFICATE OF CORRECTION

PATENT NO. : 8,711,844 B2
APPLICATION NO. : 12/987860
DATED : April 29, 2014
INVENTOR(S) : Christopher Rose et al.

Page 1 of 1

It is certified that error appears in the above-identified patent and that said Letters Patent is hereby corrected as shown below:

In the Specification

Column 1, In line 16, replace "typical" with --typically--

Column 1, In line 17, delete "s" from "phones"

Column 2, In line 58, add --d-- to "provide"

Column 4, In line 16, add --d-- to "enable"

Column 5, In line 29, add --ed-- to "add"

Column 6, In line 14, after "trols" delete "of"

Column 7, In line 31, after "of" delete "a"

Column 9, In line 48, delete "via a" before "from"

Column 9, In line 48, delete "of" after "from"

Signed and Sealed this
Twenty-third Day of September, 2014

Michelle K. Lee
*Deputy Director of the United States Patent and Trademark Office*